(12) United States Patent
Mai et al.

(10) Patent No.: US 9,421,626 B2
(45) Date of Patent: Aug. 23, 2016

(54) APPARATUS AND METHOD FOR ELECTRICAL DISCHARGE MACHINING MODULATION CONTROL

(71) Applicant: Industrial Technology Research Institute, Hsin-Chu (TW)

(72) Inventors: Chao-Chuang Mai, Taichung County (TW); Chin-Hui Chen, Taichung County (TW); Chih-Ping Cheng, Miaoli County (TW); Der-Shuen Chen, Taichung (TW); Ming-Ji Chen, Yunlin County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 627 days.

(21) Appl. No.: 13/935,752

(22) Filed: Jul. 5, 2013

(65) Prior Publication Data
US 2014/0083980 A1     Mar. 27, 2014

(30) Foreign Application Priority Data
Sep. 25, 2012   (TW) .............................. 101135108 A

(51) Int. Cl.
*B23H 1/02*   (2006.01)
*B23H 7/20*   (2006.01)
*B23H 7/04*   (2006.01)

(52) U.S. Cl.
CPC ................. *B23H 7/20* (2013.01); *B23H 1/022* (2013.01); *B23H 7/04* (2013.01)

(58) Field of Classification Search
CPC ............. B23H 1/022; B23H 7/04; B23H 7/20
See application file for complete search history.

(56) References Cited

U.S. PATENT DOCUMENTS

| 2,978,461 A | 4/1961 | Biel |
| 4,447,713 A | 5/1984 | Ozaki |

(Continued)

FOREIGN PATENT DOCUMENTS

| CN | 1112469 | 11/1995 |
| CN | 1235077 | 11/1999 |

(Continued)

OTHER PUBLICATIONS

Machine translation of Japan Patent document No. 6-315,833, Jan. 2016.*

(Continued)

*Primary Examiner* — Geoffrey S Evans
(74) *Attorney, Agent, or Firm* — WPAT, PC; Justin King

(57) ABSTRACT

An apparatus for electrical discharge machining modulation control includes an EDM module, an open-circuit voltage modulation module, a reference-voltage modulation and judgment module, a database, and a control unit. The control unit selects a reference voltage, and an open-circuit voltage corresponding to characteristics of a workpiece from the database, and generates and transmits a second control signal to the open-circuit voltage modulation module for modulating the open-circuit voltage, and a third control signal to the reference-voltage modulation and judgment module for modulating the reference voltage utilized to determine if the ignition happened. The open-circuit voltage modulation module receives a first control signal periodically transmitted from the control unit for providing the open-circuit voltage to the EDM module. The reference-voltage modulation and judgment module performs an arc voltage measurement procedure, then the control unit determines the open-circuit voltage and the reference voltage.

24 Claims, 9 Drawing Sheets

(56) References Cited

U.S. PATENT DOCUMENTS

| | | | |
|---|---|---|---|
| 4,634,827 A | | 1/1987 | Jefferson et al. |
| 4,700,039 A | | 10/1987 | Konno et al. |
| 5,233,148 A | | 8/1993 | Endou |
| 5,352,859 A | * | 10/1994 | Kaneko .................. B23H 7/20 219/69.13 |
| 5,378,866 A | | 1/1995 | Taneda |
| 5,453,593 A | | 9/1995 | Byung-Guk et al. |
| 5,742,018 A | * | 4/1998 | Akemura ............... B23H 7/20 219/69.13 |
| 2005/0115929 A1 | * | 6/2005 | Sakurai .................. B23H 7/04 219/69.13 |
| 2005/0127041 A1 | | 6/2005 | Kobayashi et al. |
| 2006/0006150 A1 | | 1/2006 | Hiraishi et al. |
| 2008/0245780 A1 | * | 10/2008 | Miki ...................... B23H 1/022 219/130.01 |
| 2010/0090708 A1 | * | 4/2010 | Kaneko .................. B23H 1/022 219/69.13 |

FOREIGN PATENT DOCUMENTS

| | | | |
|---|---|---|---|
| CN | 1898053 | | 1/2007 |
| CN | 101222995 | | 7/2008 |
| CN | 102554374 | | 7/2012 |
| EP | 139763 A1 | * | 5/1985 |
| JP | H04322910 | | 11/1992 |
| JP | 6315833 A | * | 11/1994 |
| JP | 3213116 | | 10/2001 |
| TW | I228438 | | 3/2005 |
| TW | 200520878 | | 7/2005 |
| TW | I285141 | | 8/2007 |
| TW | I298028 | | 6/2008 |
| TW | 201006595 | | 2/2010 |
| TW | 325680 | | 6/2010 |
| TW | I335848 | | 1/2011 |
| TW | 343847 | | 6/2011 |
| TW | I343847 B | * | 6/2011 |
| TW | I357840 | | 2/2012 |

OTHER PUBLICATIONS

Taiwan Intellectual Property Office, "Office Action," May 27, 2015.
Hysteresis Compensation and Adaptive Controller Design for a Piezoceramic Actuator System in Atomic Force Microscopy 2009 IEEE/ASME International Conference on Advanced Intelligent Mechatronics Suntec Convention and Exhibition Center Singapore, Jul. 14-17, 2009 Yil Chen and Mu-Tian Yan.
New ARC Detection Technology for Highly Efficient Electro-Discharge Machining Prof. Dr.-Ing. A. Behrens and Dipl.-Ing. M.P. Witzak Draft Paper Dies and Molds ' 97 Nov. 1996.
A Study of Micro—EDM on Silicon Nitride Using Electrode Materials Apiwat Muttamara, Pichai Janmaneeband Yasushi Fukuzawa International Transaction Journal of Engineering, Management, & Applied Sciences & Technologies Sep. 2010.
China Patent Office, "Office Action," Aug. 5, 2015.

* cited by examiner

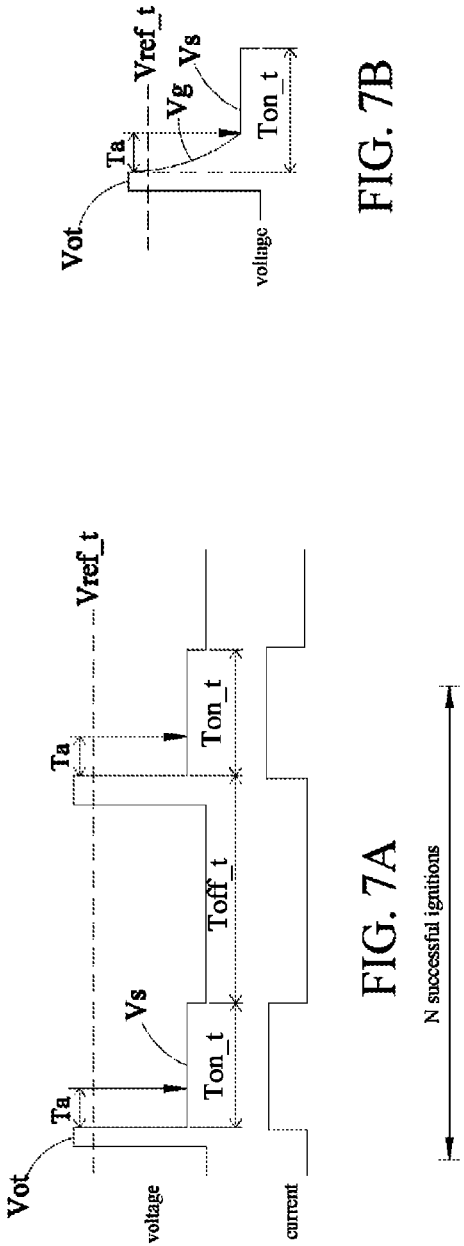
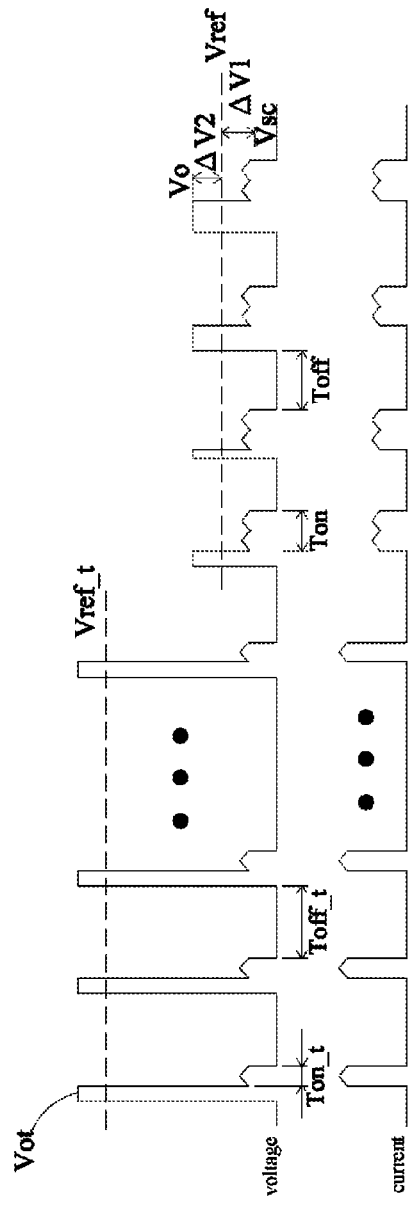
FIG. 7A
FIG. 7B
FIG. 7C

APPARATUS AND METHOD FOR ELECTRICAL DISCHARGE MACHINING MODULATION CONTROL

CROSS REFERENCE TO RELATED APPLICATION

This application also claims priority to Taiwan Patent Application No. 101135108 filed in the Taiwan Patent Office on Sep. 25, 2012 the entire content of which is incorporated herein by reference.

TECHNICAL FIELD

The present disclosure relates to an apparatus and method for electrical discharge machining (EDM), and more particularly, to an apparatus and method for EDM modulation control.

BACKGROUND

Electrical discharge machining (EDM) is used for machining a hard material that can't be machined by a conventional method, and is usually used to machine conductive materials, so as to machine a cavity or profile on a workpiece, such as tool steel and metal alloy. The principle of EDM is applying a voltage pulse, which varies rapidly and periodically, between a conductive tool electrode and a workpiece. When sparking, the discharge area generates local high temperature, then melts and vaporizes surface metal of the workpiece, thereby removing the small part of metal.

The EDM may be generally classified into an ISO-frequency machining method and an ISO-energy machining method. In the ISO-frequency machining method, a pulse duration and an off time of a pulse voltage are fixed and are not changed along with discharge situations. In the ISO-energy machining method, the ignition state is that an open-circuit voltage is provided to the electrode and workpiece by a discharge loop, a gap voltage is detected at any time. The machining state is started after sparks are generated and the gap voltage drops, at this time, the timer is started. After a period of the machining time, the off state is start and the discharge loop is turned off to stop discharging for a period of off time. Afterward the ignition state repeats, the open-circuit voltage provided by the discharge loop to perform ignition. The total procedure is repeated in this way, and the discharge energy of each machining state is the same in this mode, thereby having a desirable machining efficiency. In the ignition state, an open-circuit voltage, for example, 90 V, is provided, and when generating sparks, the gap voltage drops dramatically to a low voltage, indicating that the ignition happened, and the low voltage is referred to as "arc voltage". In conventional implementation, a reference voltage Vref is set, and when the gap voltage is less than the reference voltage during the ignition state, it indicates that the ignition happened, so that timing of the EDM is started. The conventional EDM is mainly used for machining metal conductor molds, an arc voltage of a metal conductor is about 20-30 V, so the reference voltage is generally fixed to about 50-60 V, or the reference voltage level Vref may be further adjusted by using a resistance that could be modulated, but the reference voltage level Vref is generally set to about 50-60 V.

Recently, there is a tendency of EDM development towards special material having resistance or composite materials, such as polycrystalline diamond (PCD), silicon carbide, and semiconductor. The conventional EDM cannot be performed on a polysilicon material and a silicon carbide material, because ignition discharge detection cannot be performed. Each special material, such as the silicon carbide or silicon wafer, has different material characteristics, and has a different arc voltage when the ignition happened. For example, the metal conductor has the arc voltage of 20-30 V, the PCD has the arc voltage of 20-60 V, the polysilicon material has the arc voltage of 120-160 V, and the silicon carbide has the arc voltage of 90-110 V at an initial period of sparking, and has the arc voltage of 20-50 V at a stabilized period. Moreover, in the ignition state, the open-circuit voltage should be higher than the arc voltage, so as to perform the discharge machining. Therefore, when cutting special materials, the arc voltage of the material should be known, so as to adjust the open-circuit voltage and reference voltage for ignition.

Each material has different characteristics, and even for the same material, such as the PCD, polysilicon and silicon carbide, material resistance varies due to factors such as particle size and distribution uniformity, and therefore, the manner using a single ignition voltage and a single reference voltage cannot satisfy requirements of all material machining, and may cause error of ignition discharge detection, resulting in the machining cannot be performed. Alternatively, the resistance is manually adjusted by an operator to an appropriate reference voltage level; however, this method is inconvenient, and has potential risks in work safety.

SUMMARY

In an embodiment, the present disclosure an apparatus for EDM modulation control comprises: an EDM module, an open-circuit voltage modulation module, a reference-voltage modulation and judgment module, a database and a control unit.

The EDM module receives an open-circuit voltage. The open-circuit voltage modulation module is coupled to the EDM module, so as to provide the open-circuit voltage according to a first control signal, and the open-circuit voltage modulation module further changes the magnitude of the open-circuit voltage according to a second control signal. The reference-voltage modulation and judgment module is coupled to the EDM module, so as to detect a gap voltage of the EDM module, and compares the gap voltage with a reference voltage to output an ignition result signal, and the reference-voltage modulation and judgment module adjusts the magnitude of the reference voltage according to a third control signal. The database stores reference voltages and open-circuit voltages of a plurality of workpiece materials for machining correspondingly. The control unit is coupled to the open-circuit voltage modulation module, the reference-voltage modulation and judgment module and the database, and the control unit controls the time period of outputting the first control signal according to the ignition result signal. The control unit selects the corresponding reference voltage and open-circuit voltage from the database according to characteristics of the workpiece material, thereby generating the second control signal and the third control signal, and the control unit further generates the first control signal to control the open-circuit voltage modulation module to provide the open-circuit voltage.

In another embodiment, the present disclosure a method for EDM modulation control comprises: providing an apparatus for EDM modulation control, having an EDM module, an open-circuit voltage modulation module, a reference-voltage modulation and judgment module, a database, and a control unit; the control unit determining whether the database has information of a reference voltage and an open-circuit voltage of workpiece material; if yes, the control unit, according to characteristics, selects the open-circuit voltage and the reference voltage of the workpiece material from database, respectively outputting a second control signal to the open-circuit voltage modulation module and outputting a third control signal to the reference-voltage modulation and judgment module, where the reference voltage is less than the open-circuit voltage; when receiving the second control signal, the open-circuit voltage modulation module modulating the open-circuit voltage corresponding to the second control signal, and the reference-voltage modulation and judgment module outputting the corresponding reference voltage according to the third control signal; and performing an ISO-energy EDM, further comprising the following steps: the control unit controlling the open-circuit voltage modulation module through a first control signal, so that the open-circuit voltage is output to the EDM module; the reference-voltage modulation and judgment module detecting a gap voltage of the EDM module and comparing the gap voltage with a reference voltage so as to output an ignition result signal; and the control unit, according to the ignition result signal, determining whether ignition happened, if the ignition happened, the control unit starting to count a machining on time, and after the machining on time, switching off the first control signal for a period of off time.

BRIEF DESCRIPTION OF THE DRAWINGS

FIG. 7A to FIG. 7C are schematic views of voltage states when measuring a gap voltage corresponding to successful ignition in a method for EDM modulation control.

DETAILED DESCRIPTION

Figure 1A:
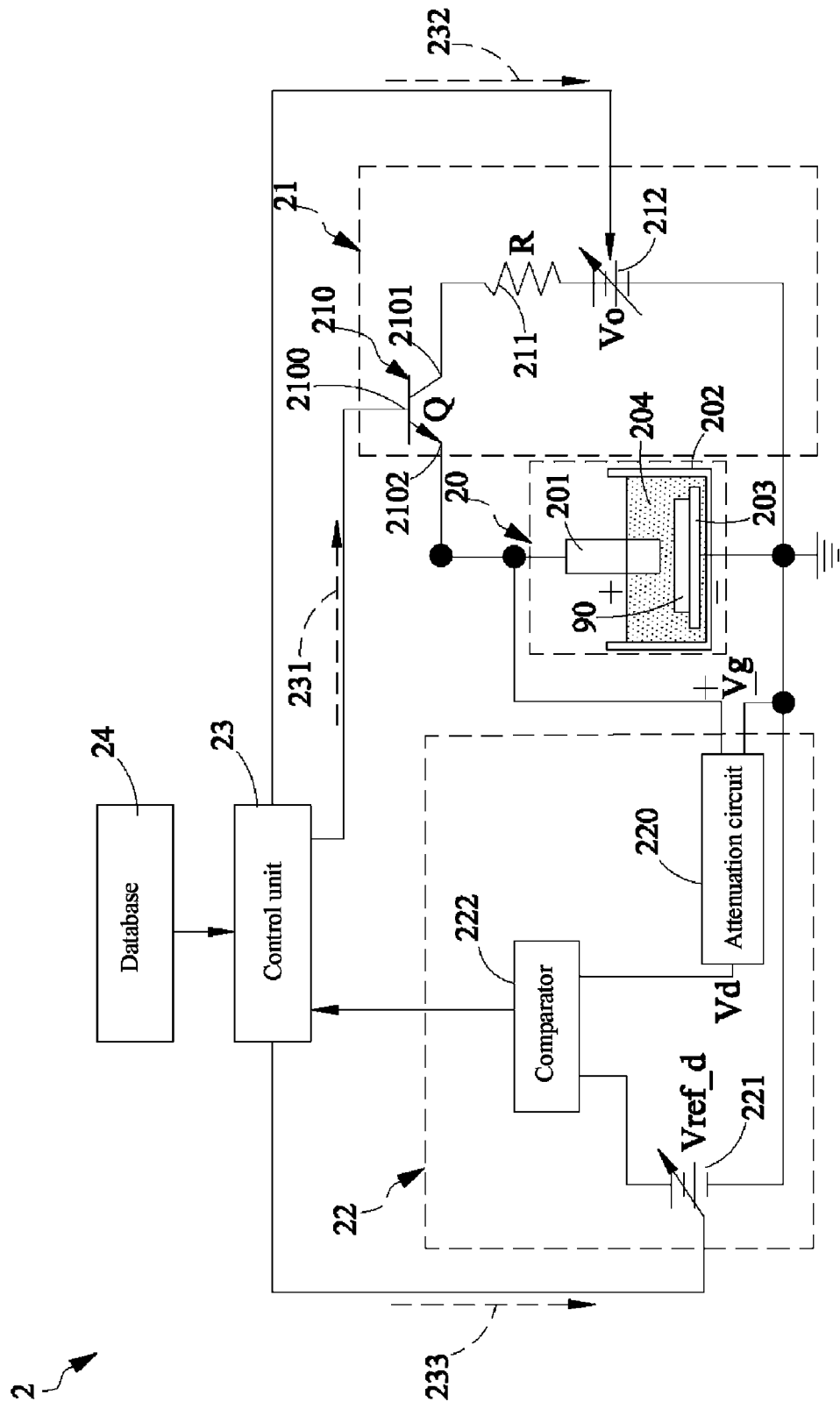
FIG. 1A is a schematic view of a first embodiment of an apparatus for EDM modulation control in accordance with an embodiment.

Referring to FIG. 1A, a schematic view of a first embodiment of an apparatus for electrical discharge machining (EDM) modulation control in accordance with an embodiment is shown. The apparatus for EDM modulation control 2 includes an EDM module 20, an open-circuit voltage modulation module 21, a reference-voltage modulation and judgment module 22, a control unit 23, and a database 24. The EDM module 20 has an electrode 201 and a tank 202. The electrode 201 may be a column electrode, and the shape and structure thereof are determined as required. In another embodiment, the electrode 201 may also be a wire electrode. The tank 202 further has a platform 203, and a workpiece 90 is disposed on the platform 203. Liquid 204 may be accommodated in the tank 202, the liquid 204 is generally, but not limited to, oil, and the liquid may be used for cooling and taking away wastes generated by EDM. The electrode 201 and platform 203 receive an open-circuit voltage and perform EDM on the workpiece 90.

The open-circuit voltage modulation module 21 is coupled to the EDM module 20, so as to provide an open-circuit voltage Vo to the EDM module 20 according to a first control signal 231. In this embodiment, the electrode 201 of the EDM module 20 represents a positive pole, and the platform 203 represents a negative pole. The electrode 201 of the EDM module 20 and the platform 203 receive the open-circuit voltage Vo, so that electrode 203 may perform EDM on the workpiece 90. The open-circuit voltage modulation module 21 further changes the magnitude of the open-circuit voltage according to a second control signal 232.

Figure 2:
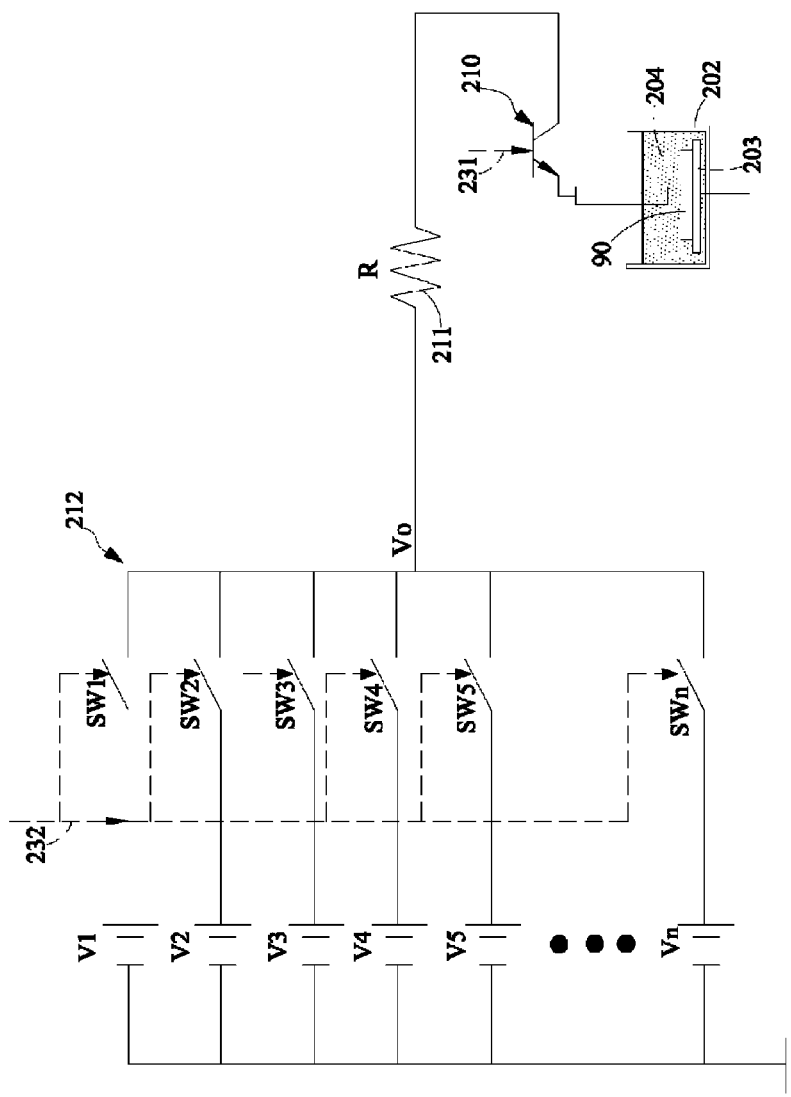
FIG. 2 is a schematic view of an embodiment of a variable voltage module of open-circuit voltage.

In this embodiment, the open-circuit voltage modulation module 21 further has a control switch 210, a resistor 211, and a variable voltage module 212. Optionally, the control switch 210 may be an element such as a transistor or a relay, and in this embodiment, the control switch 210 is a transistor. The control switch 210 has a control end 2100, an input end 2101, and a output end 2102, the control switch 210 is electrically connected to the control unit 23 with the control end 2100, so as to receive the first control signal 231, and the control switch 210 is electrically connected to the EDM module 20 with the output end 2102. The resistor 211 has one end electrically connected to the input end 2101, and the other end coupled to a positive pole end of the variable voltage module 212. A negative pole end of the variable voltage module 212 is electrically connected to a negative side of the EDM module 20. The variable voltage module 212 receives the second control signal 232 to output the open-circuit voltage, and the open-circuit voltage is transmitted to the control switch 210 through the resistor 211. Referring to FIG. 2, a schematic view of an embodiment of a variable voltage module of open-circuit voltage is shown. The variable voltage module 212 has a plurality of switches SW1-SWn, and each of the switches SW1-SWn is coupled to a corresponding voltage source V1-Vn, the voltage source in this embodiment is a direct current (DC) voltage source The second control signal 232 enables the variable voltage module 212 to turn on only one of the switches SW1-SWn, so that the voltage source V1-Vn corresponding to the switch SW1-SWn may be output to an input end pin of the control switch 210 through the resistor 211. It should be noted that, the circuit for controlling different open-circuit voltage outputs may be determined as required, and is not limited to the embodiment of FIG. 2.

Figure 3:
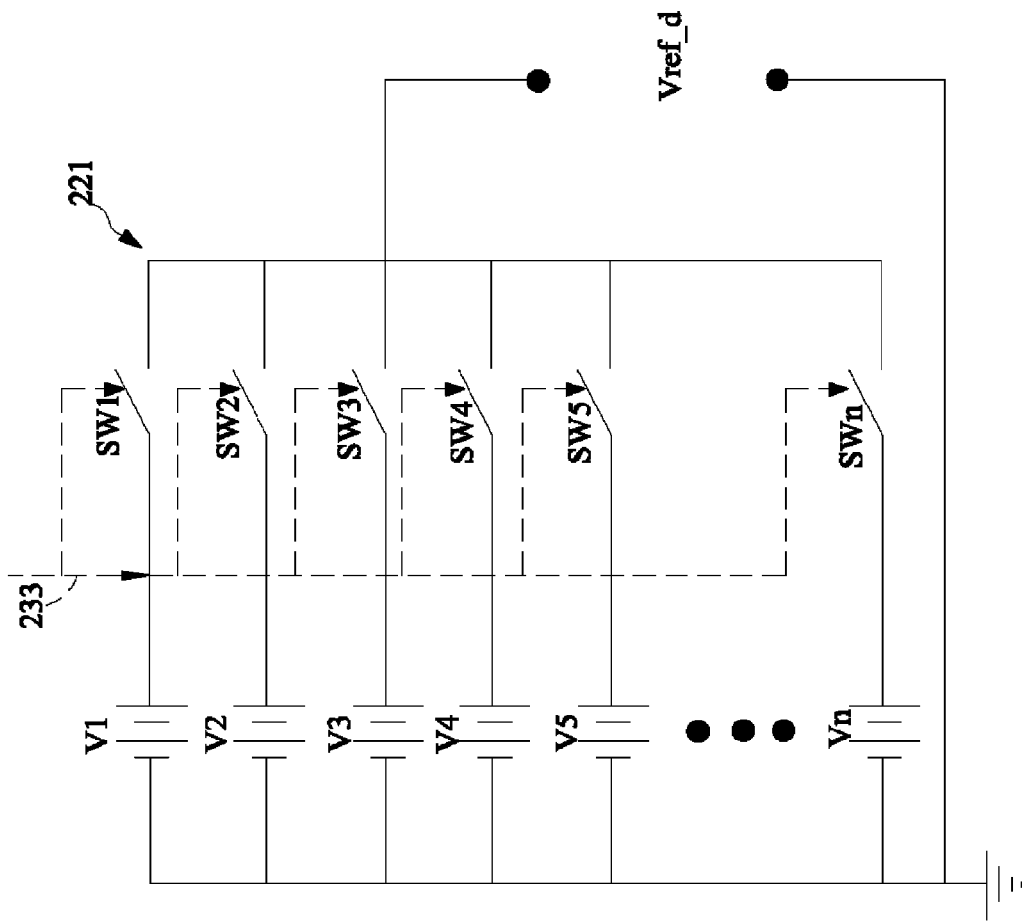
FIG. 3 is a schematic view of an embodiment of a modulation voltage source of the reference-voltage modulation and judgment module.

Back to FIG. 1A, the reference-voltage modulation and judgment module 22 is coupled to the EDM module 20, so as to detect a gap voltage Vg of the EDM module 20, where the gap voltage Vg is a voltage level difference between the electrode 201 and the workpiece 90, and the reference-voltage modulation and judgment module 22 compares the gap voltage Vg with a reference voltage Vref. It should be noted that, in this embodiment, a comparator for comparing the gap voltage Vg and the reference voltage Vref cannot perform comparison directly by using high-voltage signals, so it is required to perform attenuation on the gap voltage Vg and the reference voltage Vref in equal proportion, so as to facilitate receiving and comparing of the signals by the comparator. However, in another embodiment, if a comparator capable of receiving high-voltage signals and performing comparison, the attenuation is an unnecessary procedure. In this embodiment, the reference-voltage modulation and judgment module 22 further includes a voltage attenuation circuit 220, a modulation voltage source 221, and a comparator 222. The voltage attenuation circuit 220 is electrically connected to the EDM module 20, so as to capture the gap voltage Vg of the EDM module 20. The gap voltage Vg is of a high voltage, and in order to facilitate operation processing of the comparator 222, in this embodiment, the voltage attenuation circuit 220 is used to reduce the gap voltage Vg in an equal proportion so as to output an attenuation gap voltage Vd. The modulation voltage source 221 is electrically connected to the control unit 23, and the attenuation reference voltage Vref_d output by the modulation voltage source 221 according to the third control signal 233 is obtained by down-modulating the reference voltage Vref corresponding to the attenuation proportion of the attenuation circuit 220, and is output to the comparator 222. Referring to FIG. 3, a schematic view of an embodiment of a modulation voltage source of the reference-voltage modulation and judgment module is shown. The modulation voltage source 221 has a plurality of switches SW1-SWn, each of the switches SW1-SWn is coupled to a corresponding voltage source V1-Vn, and in this embodiment, the voltage source is a DC voltage source. The third control signal 233 enables the modulation voltage source 221 to turn on only one of the switches SW1-SWn, so that the DC voltage source V1-Vn corresponding to the controlled switch SW1-SWn output the attenuation reference voltage Vref_d to the comparator 222. In another embodiment, the modulation voltage source 221 may be a digital to analog (D/A) circuit, which converts a digital voltage corresponding to the third control signal into an analog voltage and outputs the analog voltage to the comparator, and the analog voltage is the attenuation reference voltage Vref_d. Referring back to FIG. 1A, the comparator 222 is electrically connected to the control unit 23, the voltage attenuation circuit 220 and the modulation voltage source 221, and the comparator 222 compares magnitudes of the attenuation reference voltage Vref_d and the attenuation gap voltage Vd, so as to output an ignition result signal to the control unit 23.

The database 24 stores reference voltages Vref and open-circuit voltages required by a plurality of types of corresponding workpiece material, and provides a setting of ignition open-circuit voltage and reference voltage. The control unit 23 is coupled to the open-circuit voltage modulation module 21, the reference-voltage modulation and judgment module 22 and the database 24, and the control unit 23, according to the type and characteristics of the workpiece material, selects from the database 24 the corresponding reference voltage Vref and open-circuit voltage, thereby generating the second control signal 232 and the third control signal 233. Generally speaking, the control unit may be coupled to an input interface, which is used for an operator to input the type and characteristics of the workpiece material through a display, so that the control unit 23 selects from the database 24 the required reference voltage Vref and open-circuit voltage corresponding to the type and characteristics of the workpiece material.

Moreover, the control unit 23 further generates the first control signal 231 to control the open-circuit voltage modulation module 21 so that the open-circuit voltage modulation module 21 provides the open-circuit voltage to the EDM module 20 intermittently. In this embodiment, the control unit 23, according to the ignition result signal, controls the duration of outputting the first control signal. In the ignition state, the open-circuit voltage modulation module 21 provides the open-circuit voltage to the EDM module continuously. If the attenuation gap voltage Vd is greater than the attenuation reference voltage Vref_d continuously, the ignition result signal indicates that the ignition does not happen, the control unit controls the first control signal to be sent without starting the timer, so that the open-circuit voltage modulation module 21 provides the open-circuit voltage to the EDM module 20 continuously; when the attenuation gap voltage Vd is lower than the attenuation reference voltage Vref_d, the ignition result signal indicates that the ignition happened and the machining state starts. The control unit starts to count a machining time. After a Ton time, the off state starts, the first control signal is turned off, at this time, the open-circuit voltage modulation module 21 no longer provides the open-circuit voltage to the EDM module 20, so a voltage difference between the electrode 201 and the workpiece 90 is zero, and the control unit starts to count an off time Toff. After the Toff_time, the ignition state repeats and the first control signal is output again, and the procedure is performed repeatedly.

Figure 1B:
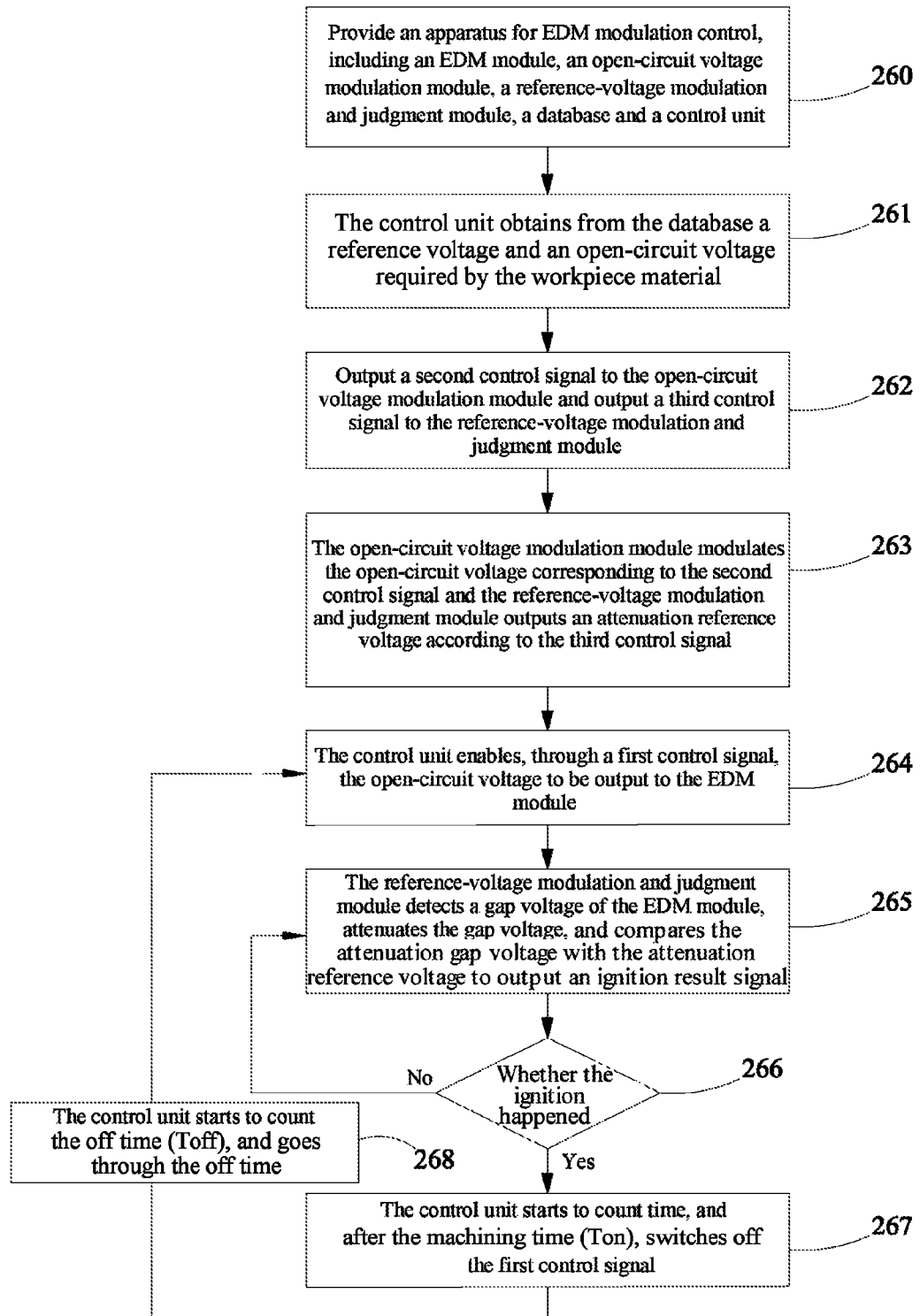
FIG. 1B is a schematic flow chart of a method for EDM control of the first embodiment of the apparatus for EDM modulation control in accordance with an embodiment.
Figure 4:
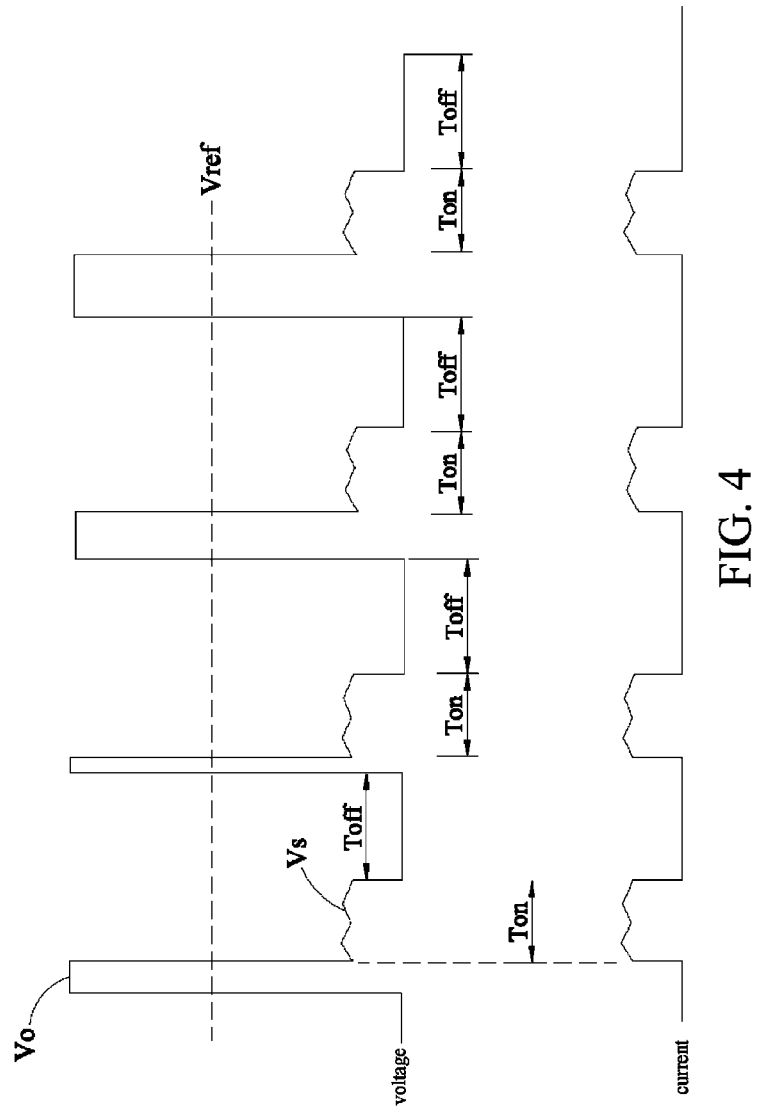
FIG. 4 is a schematic view of an EDM voltage signal of the first embodiment of the apparatus for EDM control in accordance with an embodiment.

An operation manner of the embodiment in FIG. 1A is described below. Referring to FIG. 1A to FIG. 1B and FIG. 4, in step 260, the apparatus 2 for EDM modulation control is provided. When the workpiece 90 is placed on the platform 203 of the EDM module 20, step 261 is performed, in which the control unit 23, according to characteristics of the workpiece 90, selects from the database 24 the open-circuit voltage and the reference voltage corresponding to the workpiece 90. In step 262, according to the open-circuit voltage and the reference voltage, the second control signal 232 is output to the open-circuit voltage modulation module 21 and the third control signal 233 is output to the reference-voltage modulation and judgment module 22 respectively. It should be noted that, the reference voltage Vref is less than the open-circuit voltage. Thereafter, in step 263, when the open-circuit voltage modulation module 21 receives the second control signal 232, the open-circuit voltage is modulated; and similarly, the reference-voltage modulation and judgment module 22, according to the third control signal 233, outputs the attenuation reference voltage Vref_d to the comparator 222, where, the attenuation reference voltage Vref_d is obtained by down-modulating the reference voltage Vref corresponding to the attenuation proportion of the attenuation circuit 220.

Then, in the ignition state, in step 264, the control unit 23 enables the control switch 210 to be turned on through the first control signal 231, so that the open-circuit voltage can be output to the EDM module 20 intermittently. When the control switch 210 is on, the open-circuit voltage is output to the EDM module 20 through the control switch 210, and the EDM module 20 starts to perform EDM on the workpiece 90. In step 265, the reference-voltage modulation and judgment module 22 detects a gap voltage Vg of the EDM module, attenuates the gap voltage, and compares the attenuated gap voltage Vd with the attenuation reference voltage Vref_d so as to output an ignition result signal. In this embodiment, the voltage attenuation circuit 220 of the reference-voltage modulation and judgment module 22 captures the voltage between the electrode 201 of the EDM module 20 and the workpiece 90, the voltage in this embodiment is referred to as the gap voltage Vg. The gap voltage Vg is attenuated in an equal proportion to a voltage value that can be received by the comparator 222, which is referred to as the attenuation gap voltage Vd in this embodiment, and the attenuation gap voltage Vd is output to the comparator 222. Likewise, the attenuation reference voltage Vref_d output by the modulation voltage source 221 according to the third control signal 233 is obtained by down-modulating the reference voltage Vref corresponding to the attenuation proportion of the attenuation circuit 220, and is output to the comparator 222. The comparator 222 further compares the attenuation reference voltage Vref_d and the attenuation gap voltage Vd, and the comparator 222 outputs an ignition result signal as the result of comparison to the control unit 23.

In step 266, the control unit 23, according to ignition result signal, determines whether the ignition happened, that is to say, if the ignition result signal represents that the attenuation gap voltage Vd is less than the attenuation reference voltage Vref_d, it indicates that ignition happened. At this time, the gap voltage Vg may be referred to as an arc voltage Vs. Otherwise, if the ignition result signal represents that the attenuation gap voltage Vd is greater than the attenuation reference voltage Vref_d continuously, it indicates that the ignition does not happen. When the ignition happened, the machining state starts, step 267 is performed, so that the control unit 23 starts to count a machining time. After a Ton time, the off state starts, and the control switch 210 is switched-off. In the off state, in step 268, the control unit 23 starts to count a Toff_time. After the Toff_time, the ignition state starts, step 264 is performed to perform ignition again, and the procedure is repeated. In the above embodiment, the machining time Ton is counted after the ignition happened, so the EDM undergoes the same ISO-energy machining time, thereby maintaining the machining quality and efficiency. Moreover, factors such as different materials, particle sizes and distribution uniformity cause different discharge arc voltages, so the using of constant reference voltage level and constant open-circuit voltage will cause faulty ignition determination so that the machining cannot be performed. In this embodiment, the control unit 23 modulates the reference voltage and open-circuit voltage corresponding to the material characteristics automatically, and the reference voltage and open-circuit voltage can also be adjusted by an operator through the setting of a controller, thereby overcoming the problem of ignition determination error.

Figure 5:
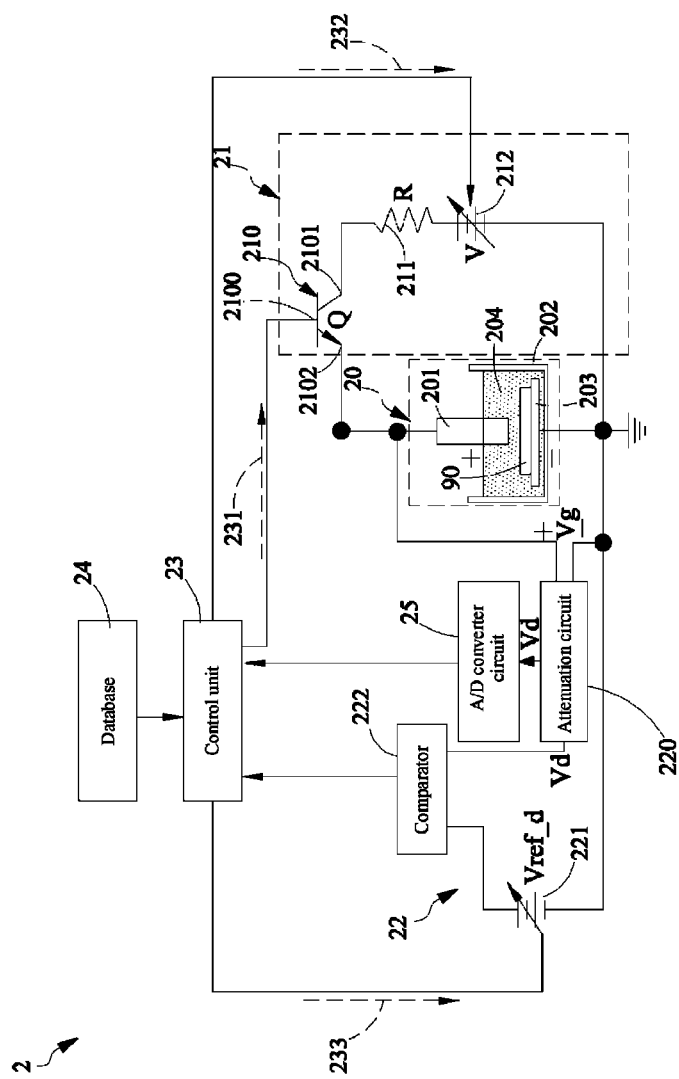
FIG. 5 is a schematic view of a second embodiment of an apparatus for EDM modulation control in accordance with an embodiment.

Referring to FIG. 5, a schematic view of a second embodiment of an apparatus for EDM modulation control in accordance with an embodiment is shown. Architecture of this embodiment is substantially similar to that in FIG. 1A, and the difference lies in that, this embodiment further has an analog to digital (A/D) converter circuit 25, which is electrically connected to the voltage attenuation circuit 220 and the control unit 23, the A/D converter circuit 25, during the EDM, converts the attenuation gap voltage Vd into a digital signal, and transmits the digital signal to the control unit 23. The control unit 23 records the digital signals, and performs numerical calculation, thereby figuring out the arc voltage most close to the reality. The calculated arc voltage is served as the reference model for subsequently adjusting the reference voltage and the open-circuit voltage. The embodiment of FIG. 5, in addition to having the features of the embodiment shown in FIG. 1A, may further detect the arc voltage during discharging for the material that does not recorded in the database 24, so as to serve as the reference for adjusting the reference voltage level and the open-circuit voltage.

Figure 6A:
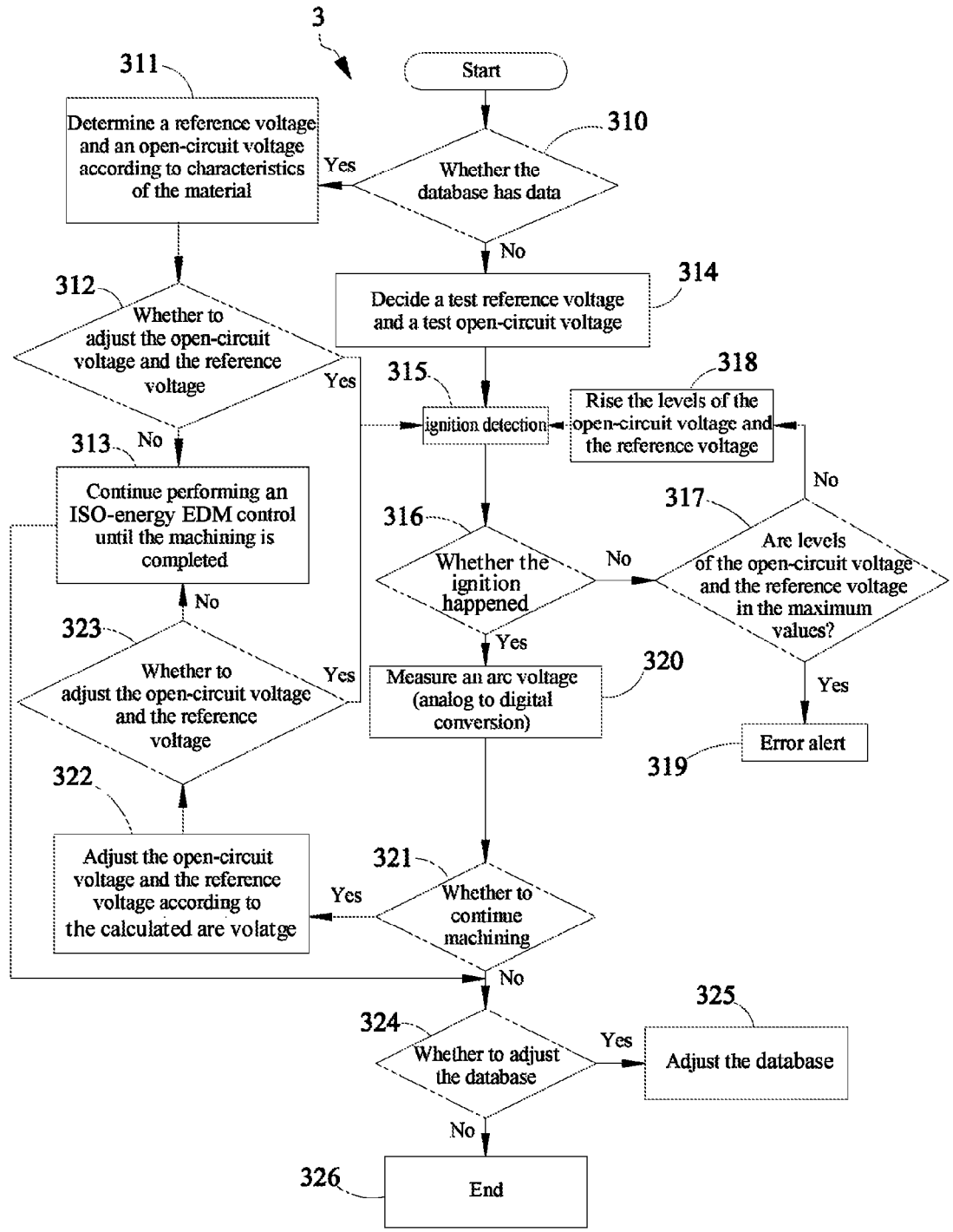
FIG. 6A and FIG. 6B are schematic flow charts of a method for EDM modulation control in accordance with an embodiment.

The method for EDM modulation control shown in FIG. 5 is described below. As shown in FIG. 6A, a schematic flow chart of the method for EDM modulation control in accordance with an embodiment is shown. The method 3 includes the following steps, first, in step 310, during initial machining, according to data of an EDM database 24, it is determined whether the open-circuit voltage and the reference voltage Vref_that are corresponding to the workpiece 90 exist in the database, if the database 24 has the open-circuit voltage and reference voltage Vref_that are corresponding to the material, the control unit 23, in step 311, performs setting corresponding to the reference voltage Vref and the open-circuit voltage, and in step 312, determines whether to online adjust the open-circuit voltage and the reference voltage Vref, if not, step 313 is performed, so the control unit 23 controls the EDM module 20 to perform ISO-energy EDM until finishing the machining. The control operation manner is similar to that in the embodiment described in the first embodiment, and is not repeated herein. If in step 312, it is selected to continue to online adjust the open-circuit voltage and reference voltage Vref, step 315 is performed, in which ignition detection and following arc voltage measurement during subsequent machining are performed. It should be noted that, although in step 310 the database has the information of the open-circuit voltage and the reference voltage corresponding to the workpiece material, for coping with the problem of arc voltage variation caused by factors such as uneven size and non-uniform distribution of material particles, the open-circuit voltage and the reference voltage of the known workpiece material can be further optimized through the ignition detection in the step 315, and the procedures are illustrated in the following paragraph.

Back to the step 310, if the database 24 does not have the data of reference voltage and open-circuit voltage of the workpiece material, in step 314, the control unit 23 generates a second control signal and a third control signal that are respectively to a test open-circuit voltage and a test reference voltage. The so-called test open-circuit voltage and test reference voltage are not necessarily specific values, and may be the maximum values of the open-circuit voltage and reference voltage or appropriate initial values set according to experiences. In this embodiment, the test open-circuit voltage and test reference voltage are appropriate initial values set according to experiences.

The second control signal and third control signal corresponding to the test reference voltage and test open-circuit voltage are respectively sent to the open-circuit voltage modulation module 21 and the reference-voltage modulation and judgment module 22. It should be noted that, the test reference voltage should be less than the test open-circuit voltage. Then, step 315 is performed, so as to perform the ignition detection. In this embodiment, the control unit 23 outputs a first control signal to the EDM module 20, so that the EDM module 20 starts to perform the EDM, and at this moment, the voltage attenuation circuit 220 captures the gap voltage Vg of the EDM module 20, and performs proportional attenuation voltage-drop for the gap voltage Vg to output the attenuation gap voltage Vd to the comparator 222. At the same time, the modulation voltage source 221 also, according to the third control signal 233, outputs the attenuation reference voltage Vref_d corresponding to the test reference voltage, the attenuation reference voltage Vref_d is obtained by down-modulation the test reference voltage Vref corresponding to the attenuation proportion of the attenuation circuit 220, and is output to the comparator 222.

Step 316 is performed, in which the comparator 222 in the reference-voltage modulation and judgment module 22 compares the attenuation gap voltage Vd output by the EDM module 20 with the attenuation reference voltage Vref_d, so as to output an ignition result signal to the control unit 23. The control unit 23, according to the ignition result signal, determines whether the ignition happened. If the ignition result signal indicates that the attenuation gap voltage is continuously greater than the attenuation reference voltage, it indicates that the ignition fails; otherwise, when the attenuation gap voltage is less than the attenuation reference voltage, it indicates that the ignition happened. If the ignition does not happened continuously, step 317 is performed, in which the control unit 23 first determines whether the current test reference voltage and test open-circuit voltage are the maximum values, if not, step 318 is performed, in which the control unit 23 rises the levels of the test reference voltage and the test open-circuit voltage, and sends the second control signal and third control signal to the open-circuit voltage modulation module 21 and the reference-voltage modulation and judgment module 22, and the procedure returns to steps 315 and 316 to determine whether the ignition happened; otherwise, if the current test reference voltage and test open-circuit voltage are of the maximum values, step 319 is performed to directly send an error alert.

Figure 6B:
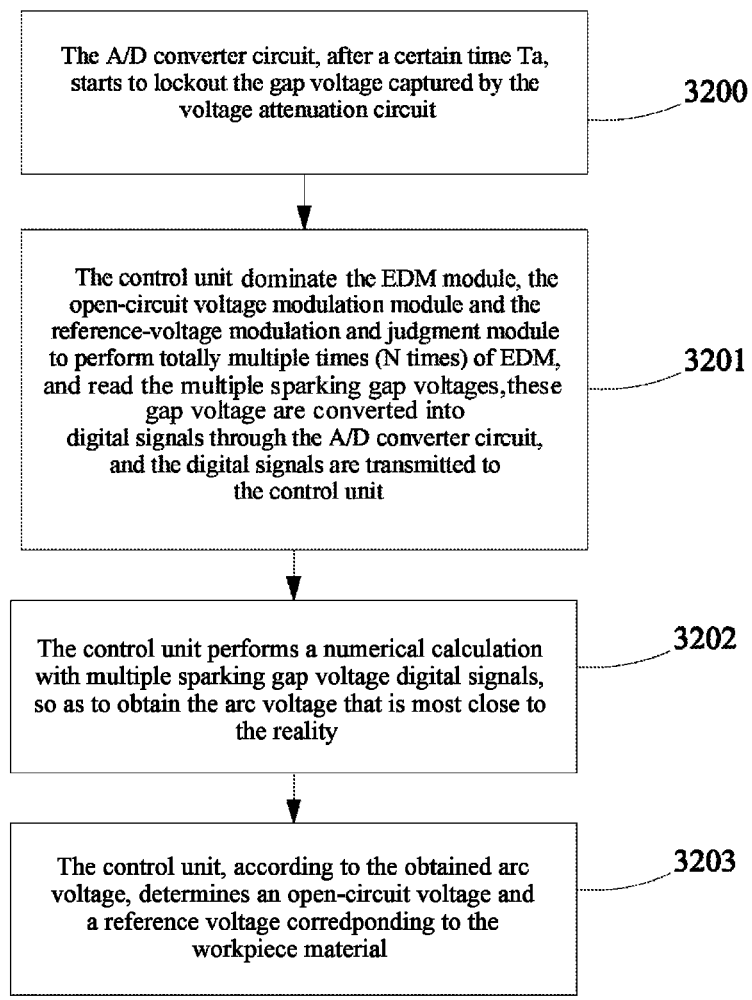

Back to the step 316, if the ignition happened, step 320 is performed to measure the sparking gap voltage. Referring to FIG. 6B and FIG. 7A to FIG. 7C, where FIG. 6B is a schematic flow chart of measuring the sparking gap voltage corresponding to that the ignition happened in the step 320, and FIG. 7A to FIG. 7C are schematic view of voltages when measuring the sparking gap voltage. As shown in FIG. 7A, Vot represents the test open-circuit voltage, and Vref_t represents the test reference voltage. In FIG. 7A, ignition happened or not is check whether that the gap voltage Vg is less than the test reference voltage Vref_t, that is, the attenuation gap voltage is less than the attenuation reference voltage. When ignition happed, step 3200 is performed, in which the A/D converter circuit 25, after a certain time Ta starts to lockout the attenuation gap voltage. It is mainly because that, as shown in FIG. 7B, after the ignition happened, the voltage is sometimes not stabilized immediately, but stabilized after a certain time, so the stabilized voltage is closer to the real arc voltage. In addition, it should be noted that, Ta should be less than a machining time width Ton_t.

In order to avoid measuring the gap voltage of abnormal discharge waveform, for example, a short-circuit voltage, in this embodiment, step 3201 is performed, in which the control unit 23 controls the EDM module 20, the open-circuit voltage modulation module 21 and the reference-voltage modulation and judgment module 22 to perform multiple times (N times) of EDM, and reads the sparking gap voltages of machining state of the N times EDM, the multiple sparking gap voltages are converted into digital signals through the A/D converter circuit 25, and the digital signals are transmitted to the control unit 23.

Then, step 3202 is performed, so that the control unit 23 performs a numerical calculation according to multiple sparking gap voltage digital signals so as to obtain the arc voltage that is most close to the reality. The numerical processing may be performing averaging operation, weighted averaging operation or maximum operation, but the embodiment is not limited thereto. Finally, step 3203 is performed, so that the control unit 23, according to the obtained arc voltage, determines a machining open-circuit voltage and a machining reference voltage. In the step 3203, as shown in FIG. 7C, a machining reference voltage Vref is obtained by pulsing $\Delta V1$ to the arc voltage Vsc calculated in step 3202, and a machining open-circuit voltage Vo is obtained by pulsing $\Delta V2$ to the machining reference voltage Vref. The magnitudes of the $\Delta V1$ and $\Delta V2$ may be determined as required and have no limits.

In addition, it should be specifically noted that, if the database 24 does not have the data of the reference voltage and open-circuit voltage corresponding to the workpiece material, step 314 is performed, in which the control unit 23 correspondingly generates a test open-circuit voltage and a test reference voltage respectively so as to perform test discharge machining, and at this time, in order to avoid the circuit overload. As shown in FIG. 7C, the control unit generates two different machining times Ton and Ton_t and two different off times Toff and Toff_t. Ton is the machining time of the normal ISO-energy EDM, and Ton_t is the test machining time of detecting the arc voltage; similarly, Toff is the off time for the normal ISO-energy EDM, and Toff_t is the test machining time when detecting the arc voltage. Ton should be greater than or equal to Ton_t, and Toff should be less than or equal to Toff_t.

Control manners of Ton, Ton_t, Toff and Toff_t are described hereinafter. When performing the steps 315-320 to detect the arc voltage, the control unit uses Ton_t as the machining time and uses Toff_t as the off time. After discharge machining is performed N times, the arc voltage is calculated, and the reference voltage and open-circuit voltage are adjusted, step 313 is performed to perform a normal EDM, and at this time, the control unit uses Ton as the machining time and uses Toff as the off time for ISO-energy EDM.

After obtaining the reference voltage and open-circuit voltage, as shown in FIG. 6A, step 321 is performed to determine whether continue to machining the workpiece, if the machining is finished, step 324 is performed to determine whether to adjust the database, if the database needs to be adjusted, step 325 is performed to record the machining reference voltage and open-circuit voltage corresponding to the workpiece material in the database 24, and if the database does not need to be adjusted, step 326 is performed to end the machining. In the step 321, if machining is not completed, step 322 is performed, in which the control unit 23 outputs to the open-circuit voltage modulation module 21 a second control signal, so that the open-circuit voltage modulation module 21 outputs the machining open-circuit voltage and outputs a third control signal corresponding to the machining reference voltage to the reference-voltage modulation and judgment module 22. Then, step 323 is performed to determine whether to online adjust the open-circuit voltage and reference voltage, if not, step 313 is performed, in which the control unit 23 controls the EDM module 20 to perform the ISO-energy EDM until the machining is completed, and the procedure of the machining is performed according to the procedure described in the embodiment of FIG. 1B. After completion, the procedure returns to the step 324 to determine whether to adjust the database. In contrast, if in the step 312, it is selected to online adjust the open-circuit voltage and reference voltage, the procedure returns to the step 315 to perform ignition detection, and perform measurement of the arc voltage and adjustment of the open-circuit voltage and reference voltage. By modulating the open-circuit voltage and the reference voltage, the problem of variable arc voltage of the material due to uneven size and non-uniform distribution of particles of the material can be solved.

It should be noted that, in the step 314 in the procedure of FIG. 6A, the determining of the magnitudes of the test reference voltage and the test open-circuit voltage is not necessarily starting from the maximum value. In another embodiment, the magnitudes of the test reference voltage and the test open-circuit voltage may be directly set as the maximum values of the voltages so as to ensure that the ignition must happen for special material.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for electrical discharge machining (EDM) modulation control, comprising:
    an EDM module, comprising an electrode, wherein the EDM module receives an open-circuit voltage;
    an open-circuit voltage modulation module, comprising a control switch, and the control switch comprising an output end electrically coupled to the EDM module, for providing the open-circuit voltage according to a first control signal, wherein the open-circuit voltage modulation module further changes magnitude of the open-circuit voltage according to a second control signal;
a reference-voltage modulation and judgment module, comprising a voltage attenuation circuit coupled to the EDM module, for detecting a gap voltage of the EDM module, wherein the reference-voltage modulation and judgment module compares the gap voltage with a reference voltage to output an ignition result signal, and adjusts magnitude of the reference voltage according to a third control signal;
a database, for storing reference voltages and open-circuit voltages required by a plurality of corresponding workpiece materials; and
a controller, coupled to the open-circuit voltage modulation module, the reference-voltage modulation and judgment module and the database, wherein the controller, according to the ignition result signal, controls a time period of outputting the first control signal, the controller, according to characteristics of a workpiece material, selects a corresponding reference voltage and open-circuit voltage from the database, thereby generating the second control signal and the third control signal, and the controller further generates the first control signal to control the open-circuit voltage modulation module to provide the open-circuit voltage, wherein the controller, according to the ignition result signal, determines whether ignition happened; if the ignition fails to happen, the controller keeps sending the first control signal; if the ignition happened, the controller starts to count a machining time; after the machining time, the controller switches off the first control signal; after the off time, the controller repeats the above process.

2. The apparatus for EDM modulation control according to claim 1, wherein the EDM module further comprises a tank, a platform is accommodated in the tank, a work piece is on the platform, the electrode and the platform are electrically connected to the open-circuit voltage modulation module, and the open-circuit voltage modulation module generates a machining voltage and outputs the machine voltage to the electrode generates a machining voltage to perform machining on the workpiece.

3. The apparatus for EDM modulation control according to claim 1, wherein the EDM module further comprises a wire electrode and a tank, a platform is accommodated in the tank, a work piece is on the platform, the wire electrode and the platform are electrically connected to the open-circuit voltage modulation module, and the wire electrode generates a machining voltage to perform machining on the workpiece.

4. The apparatus for EDM modulation control according to claim 1, wherein the open-circuit voltage modulation module further comprises:
a resistor, having one end electrically connected to the input end; and
a variable voltage module, having one end electrically connected to the EDM module, and the other end coupled to the resistor, wherein the variable voltage module receives the second control signal to output the open-circuit voltage corresponding to the second control signal;
wherein the control switch further comprises a control end and an input end; the control switch is electrically connected to the controller with the control end so as to receive the first control signal.

5. The apparatus for EDM modulation control according to claim 4, wherein the variable voltage module comprises a plurality of DC power supplies of different voltages and a plurality of corresponding switches, the plurality of DC power supplies respectively provides open-circuit voltages of different magnitudes, each switch is electrically connected to the controller, and the controller, according to the required magnitude of the open-circuit voltage, outputs the second control signal to control the corresponding switch.

6. The apparatus for EDM modulation control according to claim 1, wherein the reference-voltage modulation and judgment module further comprises:
a voltage attenuation circuit, electrically connected to the EDM module, for equal-proportionally reducing a gap voltage captured by the EDM module, so as to output an attenuation gap voltage;
a modulation voltage source, electrically connected to the controller, for generating an attenuation reference voltage corresponding to the reference voltage according to the third control signal; and
a comparator, electrically connected to the controller, the voltage attenuation circuit and the modulation voltage source, for comparing magnitudes of the attenuation reference voltage and the attenuation gap voltage, so as to output the ignition result signal to the controller.

7. The apparatus for EDM modulation control according to claim 6, wherein the modulation voltage source comprises a digital to analog (D/A) circuit.

8. The apparatus for EDM modulation control according to claim 6, wherein the modulation voltage source comprises a plurality of DC power supplies of different voltages and a plurality of corresponding switches, the plurality of DC power supplies respectively provides attenuation reference voltages of different magnitudes, each switch is electrically connected to the controller, and the controller, according to the required magnitude of the reference voltage, outputs the third control signal to control the corresponding switch, so that the DC power supply corresponding to the controlled switch outputs the attenuation reference voltage corresponding to the required reference voltage.

9. The apparatus for EDM modulation control according to claim 6, further comprising an analog to digital (A/D) converter circuit, electrically connected to the voltage attenuation circuit and the controller, wherein the A/D converter circuit, during EDM, converts the attenuation gap voltage into a digital signal to be output to the controller.

10. The apparatus for EDM modulation control according to claim 9, wherein the controller further performs numerical calculation to calculate an average value or a maximum of a plurality of gap voltage signals so as to obtain an arc voltage, and the controller further adds a random value to the arc voltage to obtain a machining reference voltage and adds another random value to the arc voltage to obtain a machining open-circuit voltage according to the arc voltage.

11. A method for electrical discharge machining (EDM) modulation control, comprising:
providing an apparatus for EDM modulation control, which comprising an EDM module, an open-circuit voltage modulation module, a reference-voltage modulation and judgment module, a database and a controller, for generating a first control signal, a second control signal and a third control signal;
the controller determining whether the database has information of a reference voltage and an open-circuit voltage required by a workpiece material;
if yes, the controller, according to characteristics of the workpiece material, selecting from the database the open-circuit voltage and reference voltage, and according to the open-circuit voltage and reference voltage, respectively outputting the second control signal to the open-circuit voltage modulation module and outputting the third control signal to the reference-voltage modulation and judgment module, wherein the reference voltage is less than the open-circuit voltage;

the open-circuit voltage modulation module, when receiving the second control signal, modulating the open-circuit voltage, and the reference-voltage modulation and judgment module adjusting magnitude of the reference voltage according to the third control signal; and performing an ISO-energy EDM, further comprising:

the controller dominating the open-circuit voltage modulation module through the first control signal, so that the open-circuit voltage is output to the EDM module;

the reference-voltage modulation and judgment module detecting a gap voltage of the EDM module, and comparing the gap voltage with the reference voltage to output an ignition result signal; and the controller, according to the ignition result signal, determining whether ignition happened, if the ignition happened, the controller starts to count a machining time, after the machining time, switching off the first control signal, and after the off time, repeating the ISO-energy EDM process.

12. The method for EDM modulation control according to claim 11, further comprising:

if the database does not have data of the reference voltage and open-circuit voltage related to the workpiece material, the controller outputting a second control signal corresponding to a test open-circuit voltage to the open-circuit voltage modulation module, so that the open-circuit voltage modulation module outputs the test open-circuit voltage, and outputting a third control signal corresponding to a test reference voltage to the reference-voltage modulation and judgment module, wherein the test reference voltage is less than the test open-circuit voltage;

performing an arc voltage measurement procedure, further comprising: the controller outputting the first control signal to the open-circuit voltage modulation module, so that the open-circuit voltage modulation module outputs the test open-circuit voltage to the EDM module; and the reference-voltage modulation and judgment module comparing the gap voltage output by the EDM module with the test reference voltage, then determining whether ignition happened, if happened, the controller starting to count a test machining time, an analog to digital (A/D) converter circuit transforming a sparking gap voltage into a digital signal to the controller, and after the test machining time, the controller switching off the first control signal, then going through a test off time;

the controller controlling the EDM module to perform the arc voltage measurement procedure for multiple times, and the A/D converter circuit transforming the sparking gap voltage into the digital signal and outputting the digital signal to the controller;

the controller performing a numerical calculation to calculate an average value or a maximum of the plurality of gap voltage signals so as to obtain an arc voltage corresponding to the workpiece material;

the controller, according to the arc voltage, determining the open-circuit voltage and the reference voltage corresponding to the workpiece material, wherein the reference voltage is less than the open-circuit voltage, and greater than the arc voltage;

the controller outputting the second control signal corresponding to the open-circuit voltage to the open-circuit voltage modulation module, so that the open-circuit voltage modulation module outputs the open-circuit voltage, and the controller outputting the third control signal corresponding to the reference voltage to the reference-voltage modulation and judgment module; and performing the ISO-energy EDM.

13. The method for EDM modulation control according to claim 12, further comprising the following step: storing and modifying the open-circuit voltage and the reference voltage in the database by the controller.

14. The method for EDM modulation control according to claim 12, wherein the reference-voltage modulation and judgment module captures the gap voltage after the ignition happened.

15. The method for EDM modulation control according to claim 11, wherein the EDM module further comprises an electrode and a tank, a platform is accommodated in the tank, a workpiece is on the platform, the electrode and the platform are electrically connected to the open-circuit voltage modulation module, and the electrode generates a machining voltage to perform machining on the work piece.

16. The method for EDM modulation control according to claim 11, wherein the EDM module further comprises a wire electrode and a tank, a platform is accommodated in the tank, a workpiece is on the platform, the wire electrode and the platform are electrically connected to the open-circuit voltage modulation module, and the wire electrode generates a machining voltage to perform machining on the workpiece.

17. The method for EDM modulation control according to claim 11, wherein the open-circuit voltage modulation module further comprises:

a control switch, having a control end, an input end and an output end, wherein the control switch is electrically connected to the controller with the control end so as to receive the first control signal, and the control switch is electrically connected to the EDM module with the output end;

a resistor, having one end electrically connected to the input end; and a variable voltage module, having one end electrically connected to the EDM module, and the other end coupled to the resistor, wherein the variable voltage module receives the second control signal to output the open-circuit voltage.

18. The method for EDM modulation control according to claim 17, wherein the variable voltage module comprises a plurality of DC power supplies of different voltages and a plurality of corresponding switches, the plurality of DC power supplies respectively provides open-circuit voltages of different magnitudes, each switch is electrically connected to the controller, and the controller, according to the required magnitude of the open-circuit voltage, outputs the second control signal to control the corresponding switch.

19. The method for EDM modulation control according to claim 11, wherein the reference-voltage modulation and judgment module further comprises:

a voltage attenuation circuit, electrically connected to the EDM module, for equal-proportionally reducing a gap voltage captured by the EDM module, so as to output an attenuation gap voltage;

a modulation voltage source, electrically connected to the controller, for generating an attenuation reference voltage according to the third control signal; and a comparator, electrically connected to the controller, the voltage attenuation circuit and the modulation voltage source, for comparing magnitudes of the attenuation reference voltage and the attenuation gap voltage, so as to output the ignition result signal to the controller.

20. The method for EDM modulation control according to claim 19, wherein the modulation voltage source comprises a digital to analog (D/A) circuit.

21. The method for EDM modulation control according to claim 19, wherein the modulation voltage source comprises a plurality of DC power supplies of different voltages and a plurality of corresponding switches, the plurality of DC power supplies respectively provides attenuation reference voltages of different magnitudes, each switch is electrically connected to the controller, and the controller, according to the required magnitude of the reference voltage, outputs the third control signal to control the corresponding switch, so that the DC power supply outputs the attenuation reference voltage corresponding to the required reference voltage.

22. The method for EDM modulation control according to claim 19, further comprising an analog to digital (A/D) converter circuit, electrically connected to the voltage attenuation circuit and the controller, wherein the A/D converter circuit, during EDM process, transforms the attenuation gap voltage into a digital signal to be output to the controller.

23. The method for EDM modulation control according to claim 11, wherein, if the database has the data of the reference voltage and open-circuit voltage related to the workpiece material, the controller further performs a step of adjusting the reference voltage and open-circuit voltage, the step of adjusting the reference voltage and open-circuit voltage further comprising:
the controller respectively determining the open-circuit voltage and reference voltage corresponding to the workpiece material as a test open-circuit voltage and a test reference voltage;
the controller outputting a second control signal to the open-circuit voltage modulation module, so that the open-circuit voltage modulation module outputs the test open-circuit voltage, and the controller outputting a third control signal to the reference-voltage modulation and judgment module to determine the test reference voltage, wherein, the test reference voltage is less than the test open-circuit voltage;
the controller outputting the first control signal to the open-circuit voltage modulation module, so that the open-circuit voltage modulation module outputs the test open-circuit voltage to the EDM module;
the reference-voltage modulation and judgment module comparing the gap voltage output by the EDM module with the test reference voltage, so as to determine whether ignition happened, if yes, an analog to digital (A/D) converter circuit transforming the sparking gap voltage into a digital signal to the controller;
the controller controlling the EDM module to perform multiple times of EDM, and the A/D converter circuit transforming the sparking gap voltage into the corresponding digital signal to the controller;
the controller performing a numerical calculation with multiple digital voltage signals corresponding to the multiple sparking gap voltages, so as to obtain an arc voltage;
the controller, according to the arc voltage, adjusting the open-circuit voltage and the reference voltage, wherein the reference voltage is less than the open-circuit voltage, and is greater than the arc voltage; and
the controller outputting the second control signal corresponding to the machining open-circuit voltage to the open-circuit voltage modulation module, so that the open-circuit voltage modulation module outputs the open-circuit voltage, and the controller outputting the third control signal corresponding to the reference voltage to the reference-voltage modulation and judgment module; and
performing the ISO-energy EDM.

24. The method for EDM modulation control according to claim 12, wherein the machining time is greater than or equal to the test machining time of measuring the arc voltage, and the off time is less than or equal to a test off time of measuring the arc voltage.

* * * * *